United States Patent [19]

Lemon et al.

[11] Patent Number: 5,078,158
[45] Date of Patent: Jan. 7, 1992

[54] BRUSH HEAD WITH A SHAPED BOTTOM PLATE

[75] Inventors: J. Robert Lemon, Charlotte; William T. Evans; Robert E. Christian, both of Batesville, all of Ark.

[73] Assignee: Professional Dental Technologies, Inc., Batesville, Ark.

[21] Appl. No.: 565,377

[22] Filed: Aug. 9, 1990

Related U.S. Application Data

[63] Continuation-in-part of Ser. No. 380,898, Jul. 17, 1989, which is a continuation of Ser. No. 59,663, Feb. 17, 1984, Pat. No. 4,869,277, which is a continuation-in-part of Ser. No. 591,114, Feb. 17, 1984, abandoned.

[51] Int. Cl.$^5$ ................................................. A46B 15/00
[52] U.S. Cl. ........................................ 132/200; 300/21; 300/2; 15/21.1; 15/183
[58] Field of Search ................... 15/21 E, 21 D, 183; 300/2, 5, 7, 19, 21, 10; D4/102; 132/167, 159, 200

[56] References Cited

U.S. PATENT DOCUMENTS 3,604,043  9/1971  Lewis ..................................... 15/183

*Primary Examiner*—John G. Weiss
*Attorney, Agent, or Firm*—William J. Sapone

[57] ABSTRACT

A brush head for cleaning and massaging the teeth and gums is disclosed having a bundle of fibers welded together to form a bottom plate. The bottom plate has formed structures produced by partially melting one end of the fiber bundle while pressing the bundle into a shaped recess in a heated tool. The shaped structures allow interlocking of the brush head with mating structures in a driving devise.

16 Claims, 3 Drawing Sheets

BRUSH HEAD WITH A SHAPED BOTTOM PLATE

CROSS-REFERENCE TO RELATED APPLICATIONS

This application is a continuation-in-part of U.S. application Ser. No. 380,898 filed July 17, 1989, pending which was a continuation of application Ser. No. 059,663 now U.S. Pat. No. 4,869,277 which was a continuation-in-part of application Ser. No. 591,114 filed Feb. 17, 1984, now abandoned.

TECHNICAL FIELD

This invention relates to a brush head, a method and an apparatus for producing a brush head particularly for dental use which has a shaped bottom plate.

BACKGROUND OF THE INVENTION

A brush head, a method and an apparatus for producing the brush head are disclosed in U.S. Pat. No. 4,869,277, commonly assigned herewith. The brush head has a sufficiently thickened base to allow effectively securing all the fibers to the bottom plate such that the brush is suitable for us in an ordinary clinical dental drill or in a battery driven home care device. Brushes produced according to the prior art suffered from the inability to insure a constant amount of fiber material for melting to form the bottom plate, in that it was difficult in practice to obtain precisely the same abutment pressure on the tool every time. This was believed to occur because the surface of the fibers was very smooth and displacement tends to occur between the feed mechanism and the fiber bundle. This gives different material amounts for the formation of the bottom, and if the fibers slide back in the feed mechanism retainer, the amount of material available is insufficient to form a bottom plate which holds all the fibers together. Thus such brushes suffered from the fibers working loose with consequent inconvenience for the user of the brush. Also, the bottom plate may become oblique in that the material is distributed unevenly at the bottom which provides poor contact with a retaining device to which the brush head is attached.

The brush head, method and apparatus for producing the brush head disclosed in U.S. Pat. No. 4,869,277 overcame these problems by assuring that the fiber bundle, during melting, is constantly carried towards a tool (or, visa-versa, the tool carried towards the fiber bundle) so that an extended bottom plate is formed, whereafter the fibers are cut at a desired length and the extended bottom plate is removed to provide the finished brush head.

While substantial success has been achieved using the brush head, method and apparatus of the '277 patent, additional improvements have been made which increase the adaptability of the brush head for use in other applications.

SUMMARY OF THE INVENTION

It is an object of the present invention to provide an improved brush head which has a shaped bottom plate for engaging with a correspondingly shaped recess in a mating tool.

It is another object of the present invention to provide a brush head which has shaped structures extending from the bottom plate for engagement with correspondingly shaped structures in a mating tool.

It is yet another object of the present invention to provide a method and apparatus for producing a brush head having a shaped bottom plate.

DETAILED DESCRIPTION OF THE INVENTION

The present invention is directed to an improved brush head and an improved method and apparatus for producing the brush head. The brush head, method and apparatus of which the present invention is an improvement, is described in U.S. Pat. No. 4,869,277, the description of which is hereby incorporated by reference.

Figure 1:
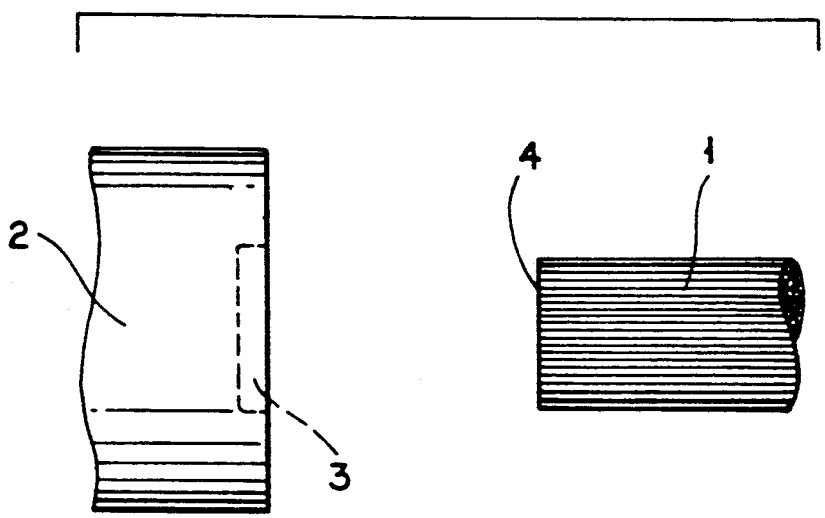
FIG. 1 shows a tool for forming a bottom plate in a brush head and a bundle of fibers prior to engagement with the tool.

Referring to FIG. 1, a bundle of fibers 1 consists of many parallel thin threads or fibers of a suitable material, such as one of the heat-weldable nylon materials, i.e. polyamide or a similar suitable material. For instance, a nylon fiber material with the designation DuPont code 0900MA may be used, in which case, approximately 1,000 to 5,000 fibers are included in bundle 1. Such a fiber bundle may typically have a diameter of from about $\frac{1}{8}$ to $\frac{1}{4}$ inch.

Opposite the bundle of fibers is a tool 2 which has a shaped recess 3 in alignment with the fiber bundle. The fiber bundle 1 is held together by a suitable tool or a holster which surrounds the bundle 1 and holds the fibers together, as described in the '277 patent. While the fiber bundle is mainly circular in cross section, it is possible that the means for holding the fibers together could be of a shaped construction to provide a bundle with other shapes. For example a square, rectangular, or multisided bundle could be provided. However, the circular cross section is preferred.

Figure 2:
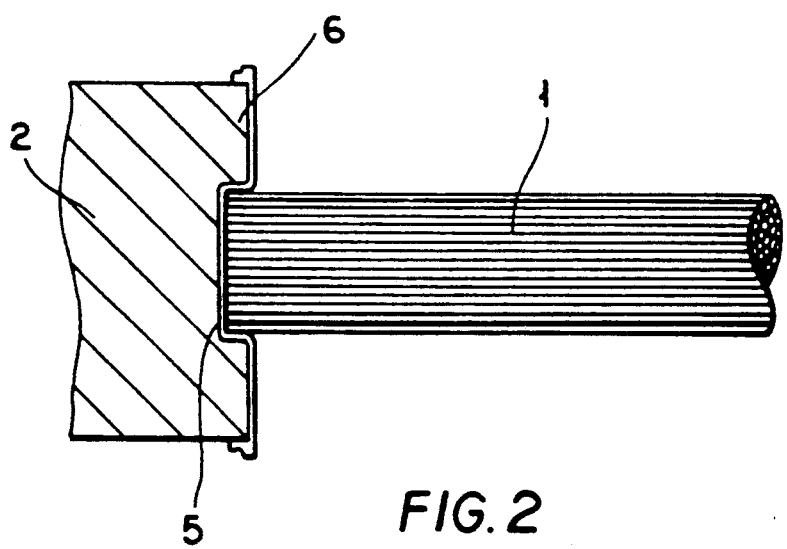
FIG. 2 shows a cross-section through the tool during fiber melting.

An end 4 of the fiber bundle 1 is pressed against the tool 2 or, vice-versa, the tool is pressed against the end of the fiber bundle, the tool being heated or having been heated prior to contact so that the end of the fiber bundle is melted and welded to form a bottom plate 5, as shown in FIG. 2.

The welding can be effected by any means of heating the tool 2 but ultrasonic heating is preferred, as the tool may be provided directly with a built in ultrasonic transducer with a frequency of, for example, approximately 40,000 hz, thus providing a simple means by which the heating and therewith the welding can be controlled.

As the fibers melt and move into the recess, the bottom plate is formed in the shape of the recess. As additional melted material fills the recess, it forms an extended bottom plate 6 which typically extends radially away from the recess. By allowing the formation of an extended plate, uniform melting and even bottom plate thickness are assured, and dimensional accuracy is achieved. Thus, all the fibers are firmly welded together, to prevent fiber separation, with consistent brush to brush shaping achieved.

Figure 4A:
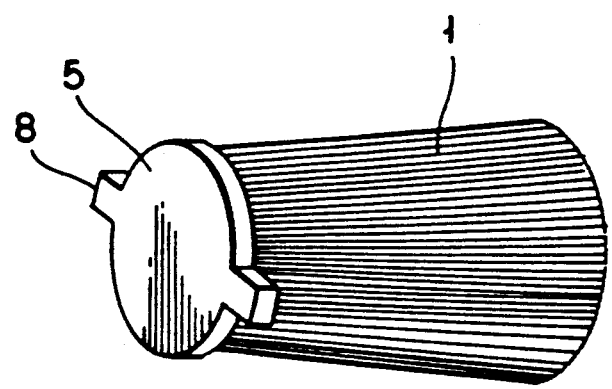
FIGS. 4A, 4B and 4C show various brush heads produced using the recess shapes of FIGS. 3A, 3B and 3C respectively.
Figure 3A:
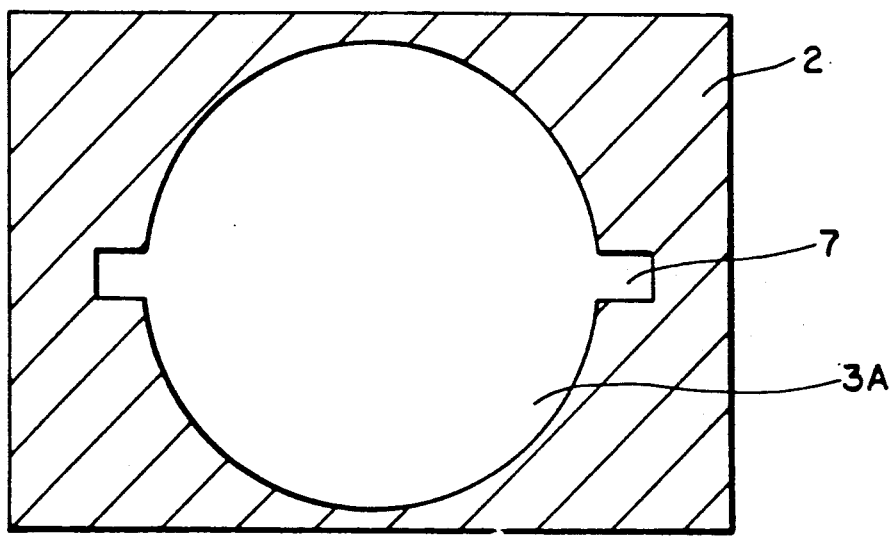
FIGS. 3A, 3B and 3C show various tool recess shapes for producing brush heads with shaped bottom plates.
Figure 3B:
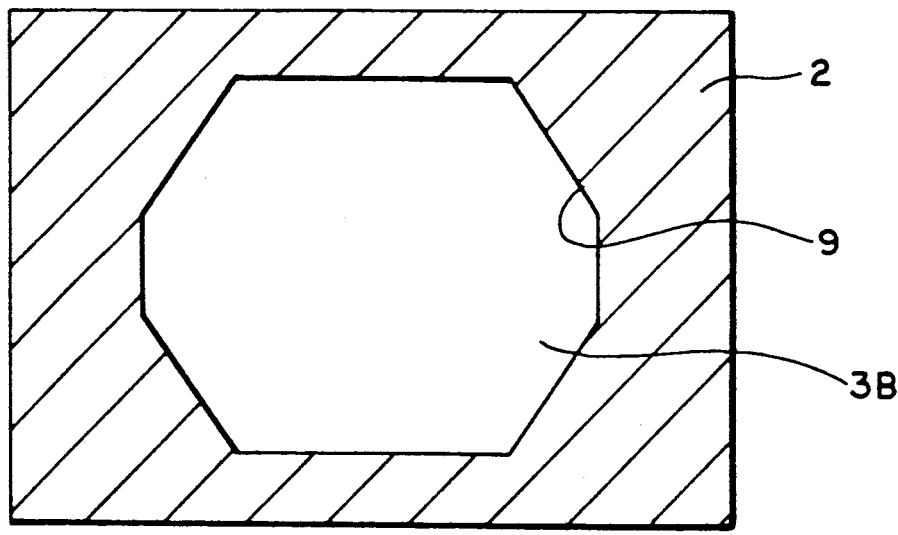
Figure 3C:
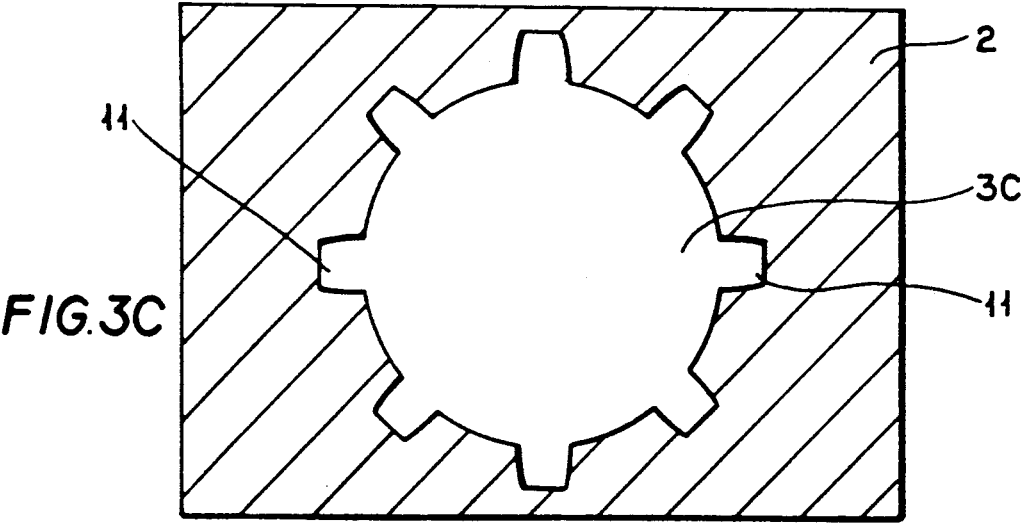

Referring to FIGS. 3A-3C, various recess shapes are shown. Referring to FIG. 3A, a recess 3A has a substantially circular shape and additionally has a pair of extending rectangular slots 7. After fiber melting, these slots fill with plastic to provide a bottom plate having a pair of locating tabs 8 as shown in FIG. 4A. A drive device to which the brush head may be attached would have a similar recess, to accept the bottom plate locating tabs and thus the brush head would essentially be locked for corotation or oscillation with the device.

Figure 4B:
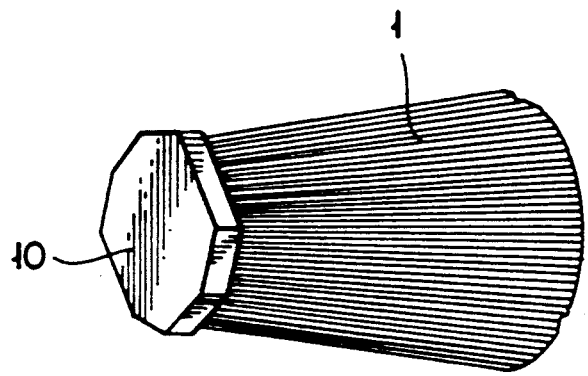

FIG. 3B shows the tool 2 with a recess 3B having an eight sided structure using a sequence of flat surfaces 9 to produce a brush head with a similarly shaped bottom plate, 10 see FIG. 4B, for locating the brush head in a similarly shaped recess in a drive device.

Figure 4C:
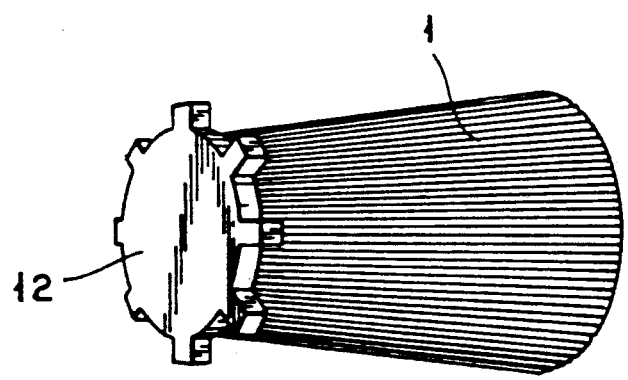

Referring to FIG. 3C, a recess 3C has a plurality of extensions 11 which produce a brush head with a similarly shaped bottom plate, 12, see FIG. 4C, to essentially provide a brush head having a bottom plate with a gear shape. This allows the brush head to be engageable by a drive gear to effect rotation or oscillation. By varying the diameter of the drive gear the speed of rotation may be correspondingly adjusted.

In each instance, the provision of the shaped bottom plate eliminates the need for having a separate drive shaft or other means for locating the brush head in the drive device.

As in the previous method described in the '277 patent for producing brush heads, the welding process depends on which material is used. If nylon is used, it may be advantageous to carry out two welding steps separated by a short period of time for cooling. The fiber bundle is first joined together lightly after which the actual welding to form the bottom plate is effected. The result is a firm and secure joining together of all the fibers without the bottom plate becoming too thick which may add too much stiffness to the brush.

When all of the fibers are secured by the bottom plate, the loose fiber (brush) portion of the brush head can be given its final machining. As described in the '277 patent, this machining is preferably carried out with mechanical tools which power grind brush parts to provide a convex or concave end or to have a recess in the tip end so that the fibers can be introduced between the teeth and into the space between the teeth and the gums for cleaning and massaging without damaging either the teeth or gums.

Although the present invention has been described with reference to particular embodiments and examples, it will be understood by those skilled in the art that variations and modifications can be substituted therefore without departing from the scope of the present invention.

What is claimed is:

1. A brush head for dental treatment including a bundle of parallel fibers, said fibers having one end welded together to form a bottom plate, said bottom plate being sufficiently rigid so as to be directly attachable to an external driving means, a brush portion of said brush head made from the end of said bundle of fibers opposite said bottom plate, the improvement comprising shaped structures provided on the periphery of said bottom plate, said structures being engageable by correspondingly shaped mating structures in said driving means, said shaped structures locating said bottom plate in said driving means for co-motion therewith.

2. The brush head of claim 1 wherein the bottom plate is circular and the shaped structures are a pair of tabs extending from the periphery of the bottom plate, perpendicular thereto and said mating structures are corresponding shaped slots.

3. The brush head of claim 1 wherein the shaped structures are a plurality of flat surfaces located about the outer periphery of the bottom plate, perpendicular thereto.

4. The brush head of claim 1 wherein the shaped structures are a plurality of extensions located about the bottom plate periphery which form the bottom plate into a gear, and said mating structure is a drive gear engageable with the bottom plate gear.

5. A method for producing a single brush head from a bundle of substantially parallel fibers or threads including the steps of partially melting one end of said bundle of fibers such that said partially melted fibers are joined together; cooling for a short time said partially melted fibers; melting said partially melted fibers so that said melted fibers are welded together to form a bottom plate, said bottom plate being sufficiently rigid so as to be directly attachable to a drive means; and shaping the end of said fiber bundle opposite the bottom plate for form a brush, the improvement comprising: forming the melted fibers together into a bottom plate having shaped structures located about the periphery thereof engageable with a drive means.

6. The method of claim 5 wherein the shaped structures are a pair of extending tabs.

7. The method of claim 5 wherein the shaped structures are a plurality of flat surfaces.

8. The method of claim 5 wherein the shaped structures are a plurality of extensions which form the bottom plate into a gear.

9. An arrangement for manufacturing a brush head of fibers of thermoplastic material including heating means for melting such fibers, means for holding together an elongated bundle of individual fibers with the individual fibers lying generally parallel to each other in the bundle, means for moving the elongated bundle of fibers relative to the heating means to bring the end of the bundle into contact with the heating means to melt the ends of the fibers while still substantially parallel to fuse them together and to continue the movement during the melting to form an integral extended bottom plate of the material of the fused melted fibers, the improvement comprising means for forming the bottom plate with shaped structures disposed about the periphery thereof for engagement with a drive means.

10. The arrangement of claim 9 wherein the means for forming the shaped structures is a tool having recess with a pair of extending slots.

11. The arrangement of claim 9 wherein the means for forming the shaped structures is a tool having a recess with a plurality of flat surfaces defining the sides of the recess.

12. The arrangement of claim 9 wherein the means for forming the shaped structures is a tool having a recess with a plurality of extensions which form the periphery of the bottom plate into a gear.

13. A method for manufacturing a brush head formed of fibers of thermoplastic material including the steps of providing a heated tool for melting such fibers, holding an elongated bundle of said fibers together with the individual fibers lying generally parallel to each other, moving the elongated bundle relative to said heated tool to bring the ends of fibers in the bundle into contact with the tool to melt the fibers to fuse them together to form a bottom plate, continuing the movement so as to further melt the bundle to extend the thickness of the bottom plate, the improvement comprising providing a shaped recess in the heated tool for producing shaped structures on the periphery of the bottom plate.

14. The method of claim 13 wherein the shaped structures are a pair of extending tabs.

15. The method of claim 13 wherein the shaped structures are a plurality of flat surfaces.

16. The method of claim 13 wherein the shaped structures are a plurality of extensions which form the periphery of the bottom plate into a gear.

* * * * *